United States Patent
Herbes et al.

[11] 3,978,975
[45] Sept. 7, 1976

[54] CARGO POWER DRIVE UNIT

[75] Inventors: Edwin James Herbes; Ray Vere Riggs, both of Seattle, Wash.

[73] Assignee: The Boeing Company, Seattle, Wash.

[22] Filed: June 30, 1975

[21] Appl. No.: 591,974

[52] U.S. Cl. .............................. 198/782; 244/137 R
[51] Int. Cl.² .......................................... B65G 13/02
[58] Field of Search ......................... 198/127 R, 25; 193/35 B, 35 SS; 244/137 R

[56] References Cited
UNITED STATES PATENTS

| | | | |
|---|---|---|---|
| 3,565,233 | 2/1971 | Hinman | 198/127 R |
| 3,888,342 | 6/1975 | Geller | 198/127 R X |

Primary Examiner—John J. Love
Assistant Examiner—Douglas D. Watts
Attorney, Agent, or Firm—H. Gus Hartmann; Bernard A. Donahue

[57] ABSTRACT

A retracting power drive unit for an aircraft cargo handling system wherein a power driven wheel or tire engages the undersurface of a cargo container for horizontally moving the cargo in different directions. The directional positioning mechanism of the power drive unit retains the tire in partial frictional engagement with the undersurface of the cargo container while the directional movement of cargo container is changed in order that the cargo container is retained under positive control at all times. This is necessary when loading or unloading an aircraft on a pitching and rolling aircraft carrier deck, or where the floor of the cargo compartment is unlevel. The operation of retracting and changing the directional orientation of the powered wheel drive unit, relies on the interaction of a dual cam system which provides for a two-step controlled lowering of the powered wheel, in addition to a rotation thereof about a vertical axis, for a change in the directional movement of the cargo container.

4 Claims, 8 Drawing Figures

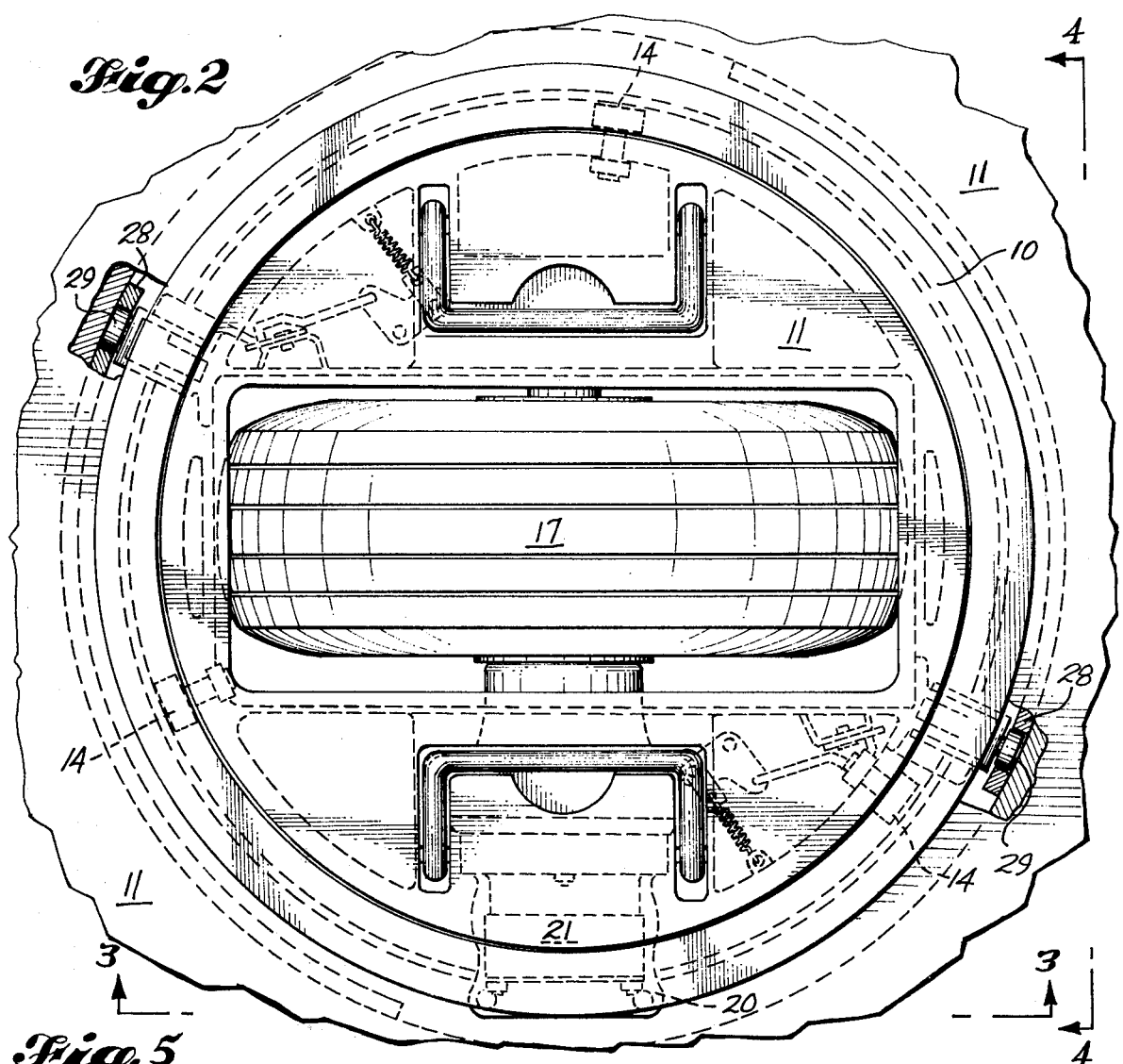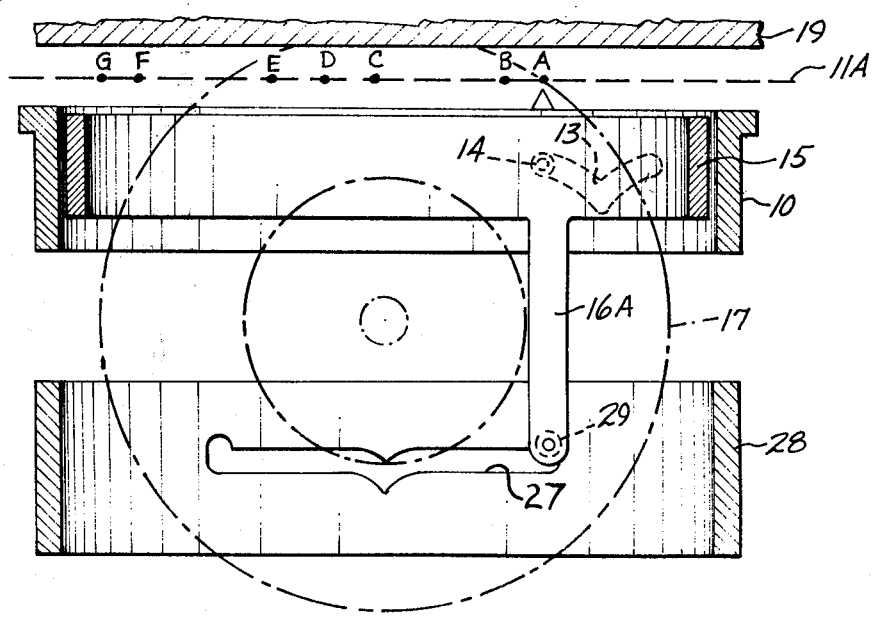

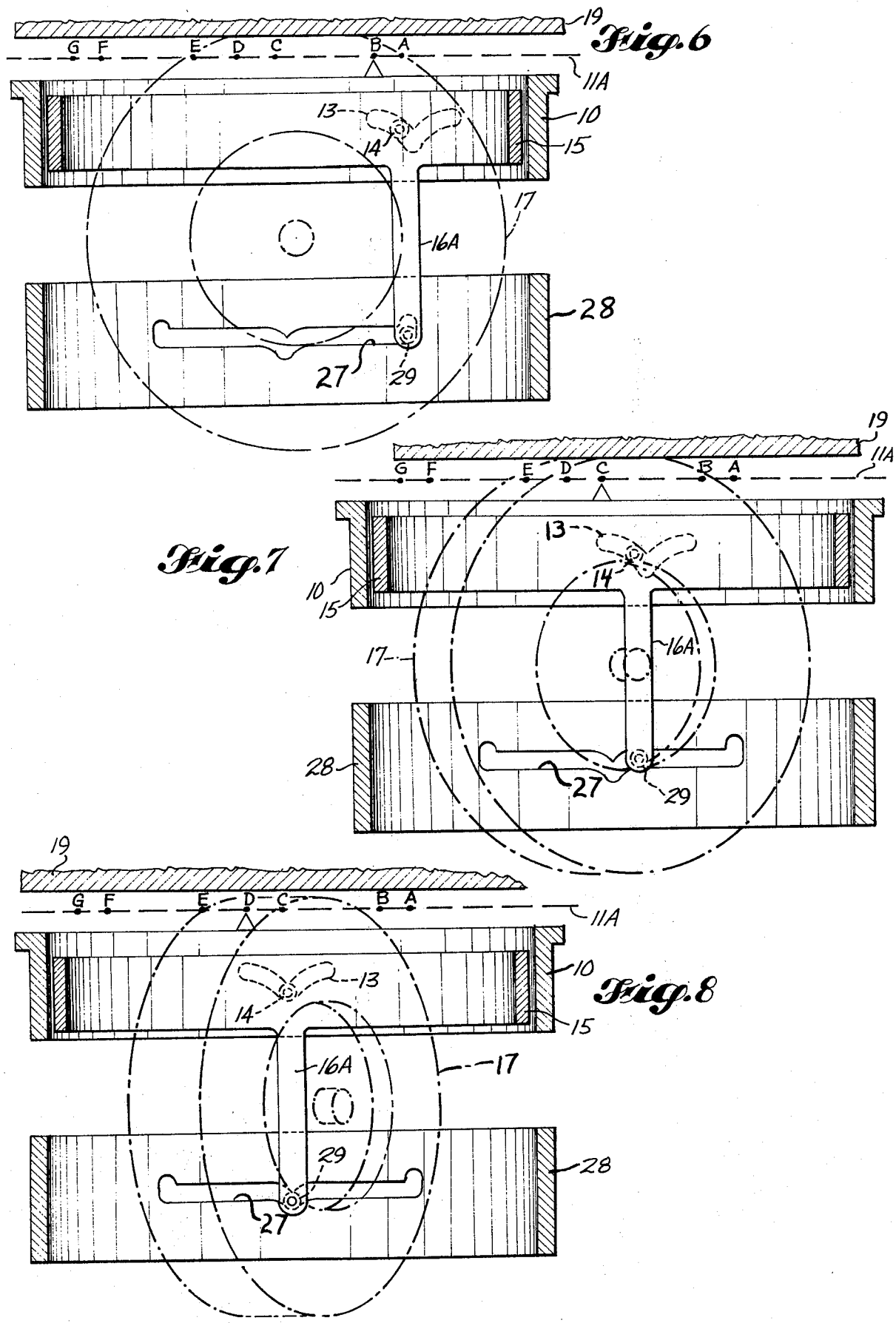

CARGO POWER DRIVE UNIT

DESCRIPTION OF PRIOR ART

One of the known power driven wheel units is shown in U.S. Pat. No. 3,565,233, R. C. Hinman, issued Feb. 23, 1971; and this unit utilizes a single cam system for changing the directional orientation of the wheel alignment simultaneously with the lowering or raising of the wheel. Whereas, in the present invention, the power driven wheel unit incorporates a dual cam system; and has the capability of a direct vertical raising or lowering of the wheel, without a change in the directional orientation of the wheel alignment. By using a double cam operation, it provides the capability of the direct vertical motion by combining the function of the two cam surfaces. There is no known way that a single cam system can perform the functions of a double cam system, i.e., a single cam cannot produce a vertical mode motion by driving it in a rotational direction.

SUMMARY OF THE INVENTION

The invention relates to cargo handling system equipment and more particularly, to a powered wheel unit that frictionally engages the undersurface of a cargo container for horizontal, lateral and longitudinal movement thereof within the cargo compartment of an airplane.

Freight handling operations for airplanes sometimes require a power drive unit that can change the direction that the cargo container travels; especially, in the situation where the cargo container is to be loaded through the side-door entrance of an airplane fuselage and then moved for stowage within the cargo compartment area. This requires a power drive unit that can move the cargo container or pallet laterally through the side-door entrance into the fuselage compartment and then the power drive unit be directionally reorientated to move the cargo container longitudinally within the compartment. In order to accomplish this cargo handling operation, the wheel or tire of the powered wheel unit of this invention, has the capability of being adjusted vertically to three positions, namely: (1) a raised position, at which the tire print engaging the undersurface of the cargo container is at a maximum for applying the maximum frictional driving force; (2) an intermediate position, at which the tire engages the undersurface of the cargo container only slightly in order to keep it from slipping; and (3) a lowered position, at which the tire is retracted clear of the undersurface of the cargo container, thereby leaving the cargo container fully supported by a roller mat positioned adjacent thereto and in combinationn therewith in order to permit manual handling thereof.

The rotating retracting power drive units are installed in conjunction with roller or caster panels and trays. These roller or caster panels and trays provide the basic support for the cargo containers. Tractive power to move the containers is provided by the power drive units. In the raised or full up operating position, approximately 0.7 in. above the top of the roller caster plane, a vertical load of approximately 1,850 lbs. for a standard sized, fully loaded container, is reacted by the drive wheel. When the wheel is retracted to the intermediate position, apprroximately 0.2 in. above the top of the roller caster plane, approximately 35% of this load is being reacted by the wheel. When fully retracted, approximately 0.7 in. below the top of the roller or caster plane there is no vertical load being applied to the wheel.

For a change in directional movement of the cargo container, e.g., from lateral movement to longitudinal movement, within the cargo compartment, the tire of the present invention, is lowered vertically to its intermediate or partially retracted position during its change in directional orientation. At this intermediate position, the power drive unit is permitted to retain control of the cargo container with a greatly reduced tire scrubbing wear action that would result if the tire had remained in its raised or full up and maximum frictional engaging position. Also, it will be understood that the cargo container can be manually directionally oriented on the roller mat when the tire is at its lowered position where it is clear of the container base.

An advantage of the invention is that with the dual cam system, the wheel is capable of being lowered or raised without changing the directional orientation thereof; and further, the directional orientation of the wheel can be changed without raising or lowering of the wheel.

BRIEF DESCRIPTION OF THE DRAWINGS

FIG. 2, is a plan view of the powered wheel.

FIG. 5, 6, 7 and 8 are side elevation schematic views of the upper and lower cam tracks in combination with the wheel supported rollers interconnection, depicting the various rotational positions of the wheel and dual cam system.

DESCRIPTION OF THE PREFERRED EMBODIMENTS

Figure 1:
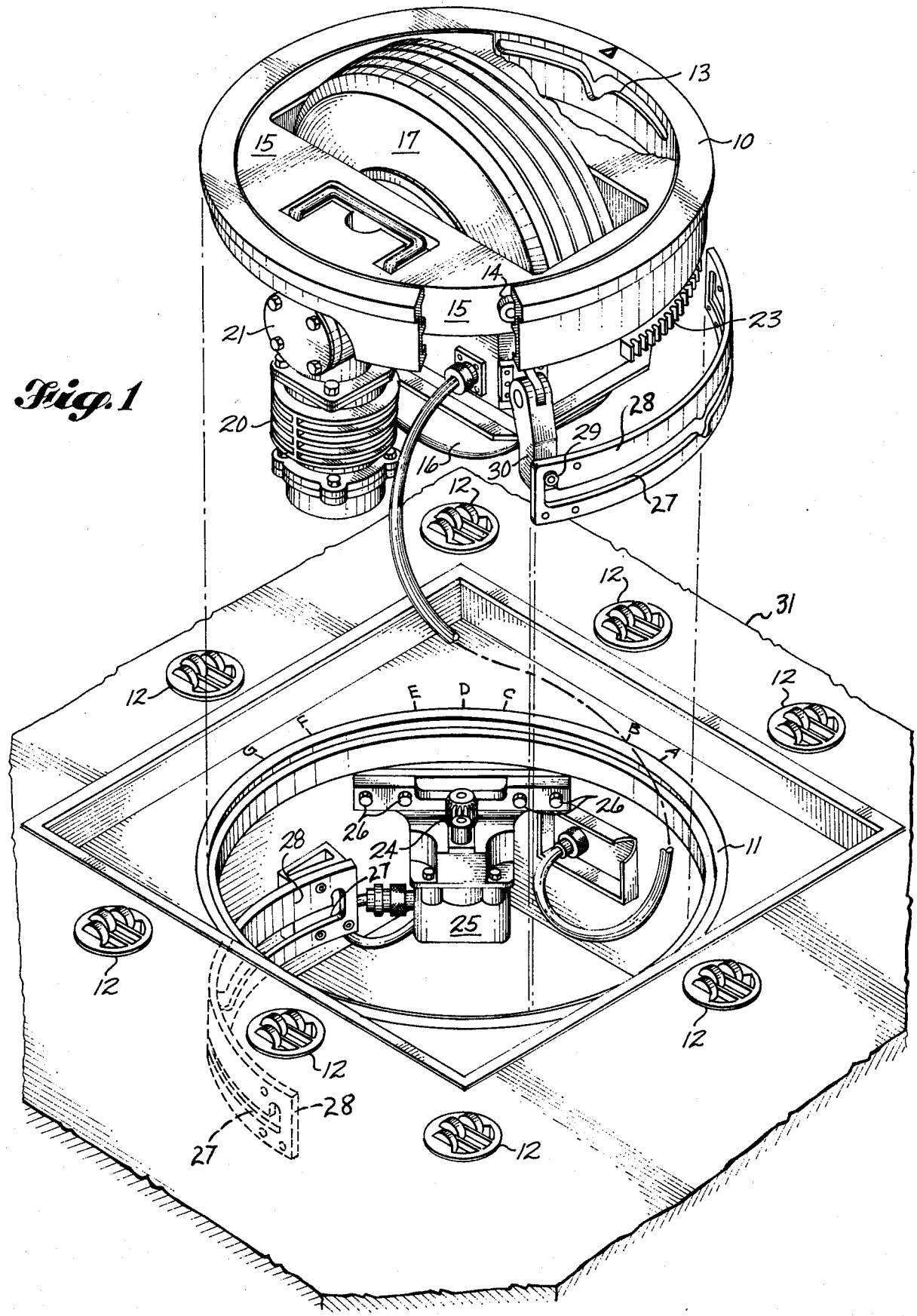
FIG. 1, is an isometric view of the powered wheel drive unit of the present invention, shown in a detached position with respect to its mounting into the floor structure.
Figure 3:
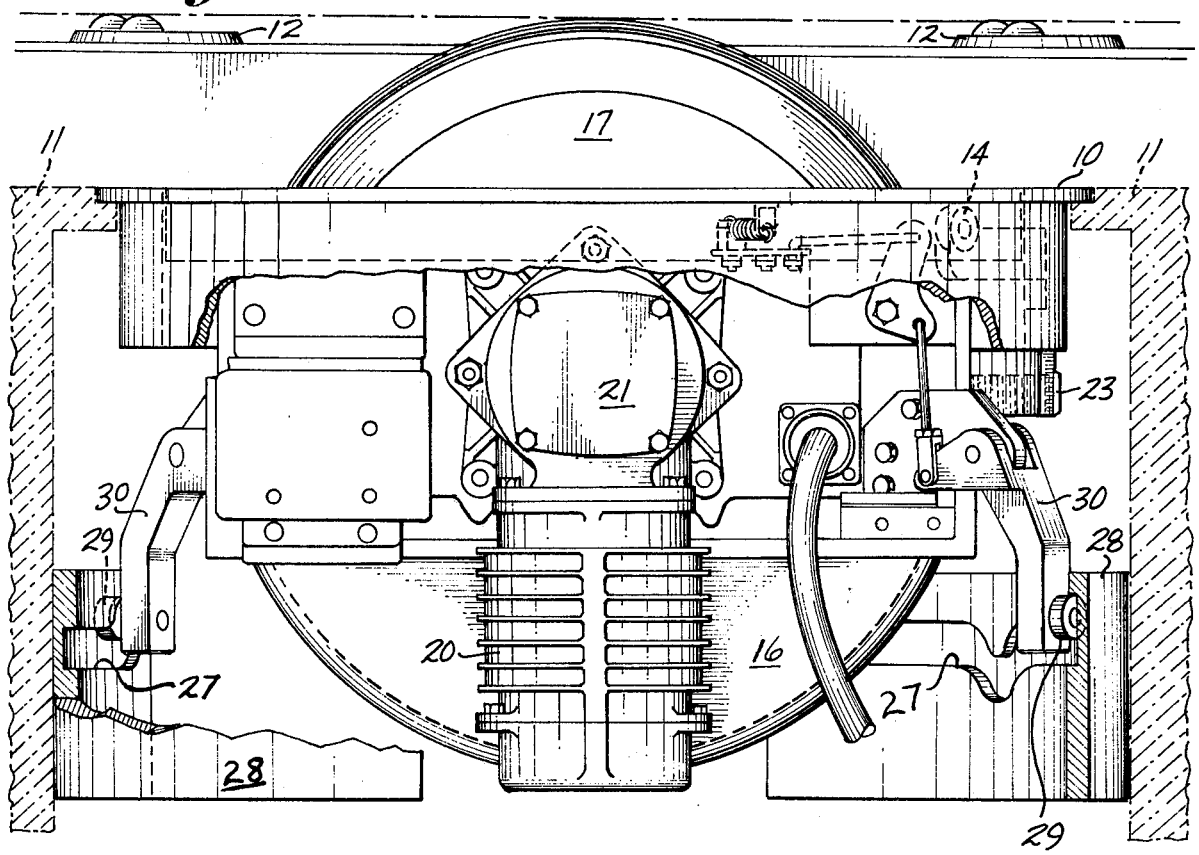
FIG. 3, is a side elevation view taken in the direction indicated by 3—3 of FIG. 2.
Figure 4:
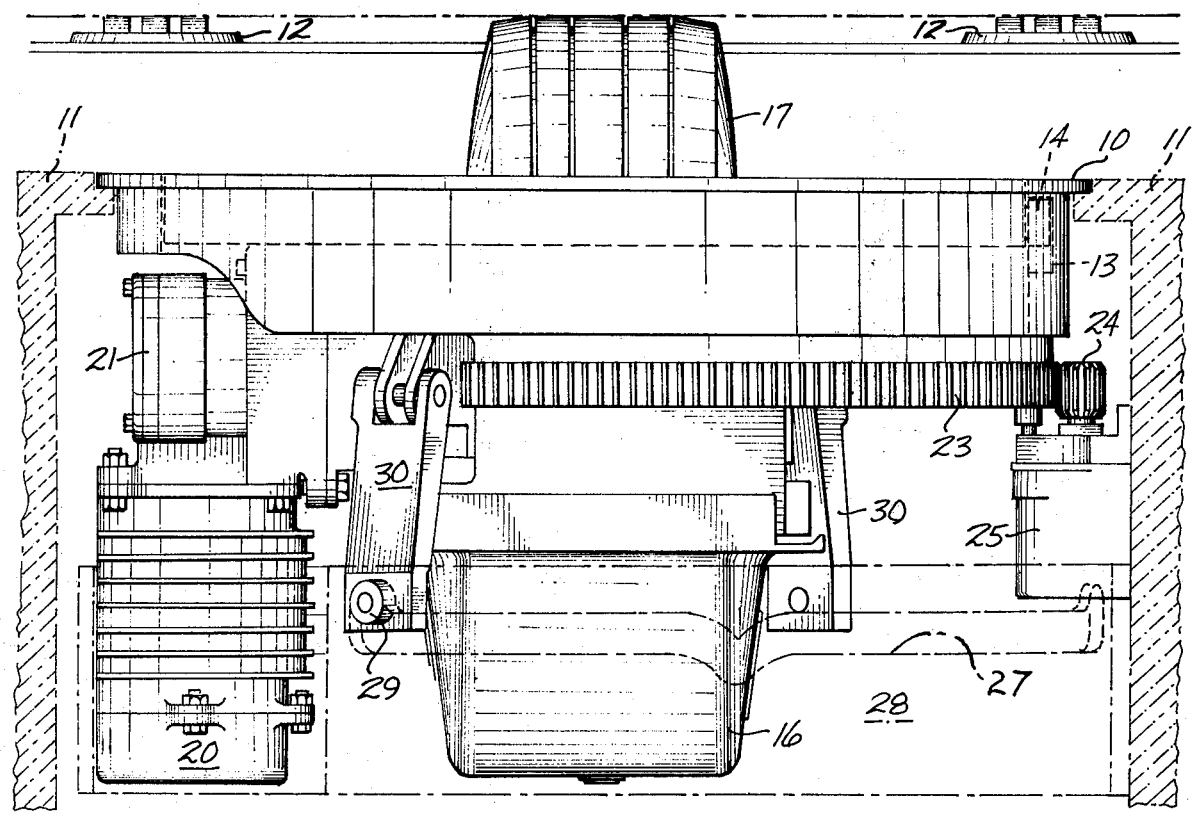
FIG. 4, is an end elevation view taken in the direction indicated by 4—4 of FIG. 2.

FIGS. 1 to 4 show in detail the components of the Power Drive Unit (PDU) assembly of this invention. A flanged ring 10 supports the PDU when it is inserted into the mating ring support 11 in the circular floor opening of an aircraft cargo compartment. The PDU is installed in combination with a plurality of self-aligning casters 12 or with a roller mat which provides the basic load support for the cargo, with the PDU providing the tractive force to move the cargo horizontally. The flanged ring 10 has a series of three alike cam profiles 13, arranged symmetrically around on its inner face or inner periphery. Each of these cams 13 is engaged by a cam follower bearing 14 mounted on a disk or circular wheel support plate 15; and this wheel support plate 15 is fixedly connected to a wheel housing 16. The upper cam 13 is a machined profile surface which is designed to be followed by the cam follower device 14 to impart a special type of action; it can be either a machined-in surface or a machined-out surface. However, in the PDU of this invention as shown in the figures, it is a machined-in surface. The upper cam follower 14 is fixedly connected to the wheel support plate 15 and supports this plate through the cam follower's relationship with the machined profile surface of the cam 13. The upper cam follower 14 can be either a roller bearing follower which is commonly used in high performance cams, or it can be just a straight rod that follows the profile of the cam. However, it is shown in the drawings as a roller bearing follower.

The wheel support plate 15 is fixedly connected to the wheel housing 16 which rotatably supports the tire or wheel 17. The wheel 17 is driven by a motor 20 through right-angle gearing 21 and a splined shaft connnection (not shown).

To accommodate tire height differences, the wheel motor assembly 20 is mounted to the wheel support housing 16 through serrated plates and bearings (not shown) which permit a vertical height adjustment of the tire above the top of the caster or roller mat plane or the amount that the tire print engages the undersurface of a cargo container.

The flanged ring 10, which has a cam profile 13 on the inner surface thereof, also has a gear segment 23 fixed to the underside thereof. This gear segment 23 engages with the pinion gear 24 which is driven by the motor 25 mounted through bolts 26 to floor structure, when the flanged ring 10, into which the PDU is mounted, is lowered vertically as shown in FIG. 1, into the mating ring support 11 in the floor opening. The flanged ring 10 is rotatably driven relative to the fixed mating ring 11 which is fixedly mounted in the floor opening, through the driven gear segment 23 engaging the driving pinion gear 24.

The PDU is installed in conjunction with the casters 12 or roller mat which supports the major portion of the cargo container load. For an installation in an airplane like the Boeing 747 freighter, the raised position of the PDU would place the top of the tire approximately 0.7 in. above the tip of the roller mat 31 and due to tire size nd inflation pressures, would be capable of applying a vertical load of approximately 1,850 lbs. when the tire is depressed to the plane at the top of the casters 12 or roller mat. When the PDU is lowered to the intermediate position, the tire is approximately 0.2 in. above the top of the roller mat plane; and in this position, supports approximately 35% of its raised position load. With the PDU at this intermediate position, there is only enough load left on the tire to provide a friction surface for the cargo container; so that it will not have a tendency to roll away from its position on the roller mat. This tendency for the cargo container to roll, is a physical hazard to the persons handling cargo containers; in that, if a person is standing between two cargo containers and one of them begins to roll, there is the possibility of that person being mashed or his hands or feet being injured. There are cargo system locks throughout the floor area of the cargo compartment, which locks are manually engaged, and many of them require that a person reach down fairly close to the bottom of the cargo container to engage these locks. If the cargo container were to shift while the locks were being engaged, it could easily runn over his hands. For manually moving the cargo container on the roller mat, the PDU is retracted to its lowered position where the top of the tire is approximately 0.7 in. below the top of the roller mat.

Also, shown in FIG. 1, are a pair of lower cam surfaces 27 on ring segment members 28: one of which is transposed to depict its operative engaging relationship with its cam follower 29 which is mounted through an arm 30 to the wheel housing 16; and the other cam ring 28 is shown in its normal fixed position mounted to structure in the floor.

The operation of retracting and changing the directional orientation of the powered wheel drive unit, relies on the interaction of two cam systems. Basically, the two cam systems, comprise: an upper driving cam surface 13 and a lower fixed cam surface 27, with the cam followers, 14 and 29 respectively of the upper and lower cams, being interconnected between the two cam surfaces 13 and 27 by the powered wheel housing 16; and the motion to the upper driving cam surface 13 being supplied by an external motor 25 through gearing 24 and 23.

The upper driving cam system or the first cam 13 and follower 14 system, is interposed between the inner surface of the flanged ring member 10 and the wheel support plate 15 which is fixed to the wheel housing 16; and the lower fixed cam system or second cam 27 and follower 29 system, is interposed between the wheel support housing 16 and fixed structure in the floor of the airplane.

FIGS. 5 – 8 are schematic drawings of the basic principle of the dual cam system represented in a side elevational layout, wherein like numerals represent like parts of the powered drive wheel assembly. The sequential operation of the dual cam system, from points A to G, will be described with reference to the figures and related to the operation of the PDU for moving a cargo container 19 laterally through the side doorway of an airplane fuselage and longitudinally within the fuselage. Further, since both the upper cam follower 14 and the lower cam follower 29 are fixed to the wheel housing 16, their horizontal rotation movement represents a steering movement or a change in the directional alignment of the wheel 17. Also, any vertical movement of the upper and lower cam followers 14, 29, is directly related to a vertical movement of the wheel housing 16 and likewise the powered wheel 17.

Assume that the initial position shown in FIG. 5 represents the PDU, which is installed in the entry way of the side-door, at its raised position. At this raised position, the top of the tire is approximately 0.7 in. above the top of the roller mat plane; and the wheel is directionally aligned in an inboard-outboard direction for moving the cargo containter laterally through the side-door entrance, into the fuselage cargo compartment. The start of rotation of the upper cam ring 10 relative to its mating support ring 11 in the floor opening, through its gear segment 23 being driven by the meshing pinion gear 24, is represented in the schematic drawing of FIG. 5. Drawn above the upper cam ring 10 is a dashed line 11A which is to represent the stationary mating support ring 11; and the point A, as also shown in FIG. 1, thereon is to designate the initial position of the wheel 17. Referring to FIG. 1, it will be noted that the interconnection between the upper cam follower 14 and the lower cam follower 29, is basically through the circular wheel support plate 15 and the wheel support housing 16, and since they are relatively fixed with respect to each other, they could be schematically represented by a simple link. Therefore, in FIGS. 5 to 8 this wheel support plate 15 and housing 16 interconnection between the upper and lower cam followers 14, 29, are depicted by the link 16A. The arrow is shown affixed to the upper cam ring 10 and the alignment of the arrow with points A to G represents the rotation of the wheel through a directional alignment change of 90°. The initial rotational movement of the flanged upper cam ring 10 relative to its fixed mating support ring 11 results in movement of the upper driving cam surface 13 from point A to point B. This causes the profile on the upper cam surface to force the upper cam follower 14 to move along its profile, until the lower cam follower 29 descends in the vertical cam slot at the end of the lower stationary cam surface 27. This movement of the upper cam ring 10 and driving cam surface 13, from point A to point B, relative to the inner circular wheel support plate ring 15 structurally fixed to the powered wheel drive unit represented by the fixed link 16A, results in a controlled first step lowering of the wheel 17. As shown in FIG. 6, the wheel 17 is lowered approximately ½ in. from its raised position to its intermediate position, at which the tire is approximately 0.2 in. above the top of the roller mat surface plane.

Referring to FIGS. 6 and 7, continued motion of the upper cam ring 10 and driving cam surface 13 from point B to C, causes the upper cam follower 14 to bear against and be carried by the profile of the upper driving cam surface 13; and thereby moves the lower cam follower 29 along in the horizontal slot of the lower stationary cam surface 27 of ring segment 28. This interaction between the angle of the upper cam 13 and the flat surface of the lower cam 27, provides that the wheel 17 and housing, represented by 16A, starts rotating.

Continued movement of the upper driving cam surface 13 through rotation of cam ring member 10, from point C to D, continues rotation of the wheel 17 and housing 16A towards approximately 45°. Also, during this interval, due to the approximate match of the downward sloping profiles on both the upper and lower cams, the wheel descends to its lowered position, at point D, with a full clearance beneath the cargo container 19 and the height of the roller mat surface plane. This leaves the cargo container 19 fully supported on the caster or roller mat 12 for manual handling thereof, if movement of the upper driving cam surface were stopped at this position. However, in normally changing the directional alignment of the wheel through 90°, this cargo container disengagement position is momentary and of approximately a 2 second duration; which has been found to be insufficient time for the cargo container to move any noticeable amount. This cargo disengagement position of 45° is selected primarily as a manufacturing convenience; because it permits symmetrical cam design which is less expensive to produce and install than a nonsymmetrical cam profile. Due to the symmetry of the upper and lower cam profiles at the 45° position, as shown in FIG. 8, the continued movement of the upper driving cam surface will result in a reversal of the operation thus far described.

Continued movement of the upper driving cam surface 13, from point D to E, causes the upward sloping to bear against the upper cam follower 14, and due to the approximate match of the upward sloping profile on the lower cam surface 27, both of the cam followers are borne upwards by the sloping profiles on the cams; thereby raising the wheel 17 back up to its intermediate position at point E; in a manner reverse to that described with respect to movement from C to D.

Continued movement of the upper driving cam surface 13 from point E to F, causes the upper cam follower 14 to bear against the upward sloping profile on the upper cam surface 13; however, due to the horizontal slot in the stationary lower cam 27, there is no vertical movement of the wheel 17 and housing 16A and the wheel 17 remains at its intermediate position; and this interaction between the cams and their followers, provides that the wheel housing continues rotating until is traverses through its complete arc of 90°. This arc of rotation of the wheel housing is regulated by the horizontal length of the slot in the lower cam 27 and for other specific applications of traversed arcs other than 90°, the horizontal slot length can be changed to produce the desired arc.

Continued movement of the upper driving cam surface 13 from point F to G, causes the upper cam follower 14 to bear against the upward sloping profile on the upper cam 13. However, due to the vertical slot in the stationary lower cam 27, the upper cam follower 14 is permitted to move upward along the profile of the upper cam surface, until both the upper and lower cam followers are raised vertically approximately ½ in. This results in the wheel 17 and housing 16A being raised from their intermediate position to the raised position, where the wheel 17 is approximately 0.7 in. above the top of the caster or roller mat plane 12; and the wheel being directionally aligned in a fore-and-aft direction for moving the cargo container longitudinally within the cargo compartment, from the side-door entrance way.

What is claimed is:

1. A power drive unit for cargo handling, comprising: a wheel mounted on an axle; means mounting the axle horizontally; means for rotating the wheel; means for vertically positioning the wheel to three positions: a raised position for maximum frictional engagement with the undersurface of cargo positioned thereon to move it in a horizontal direction, a lowered position for complete disengagement with the undersurface of cargo, and an intermediate position therebetween for partial frictional engagement with the undersurface of cargo positioned thereon during transition between predetermined directionally orientated cargo driving positions; said means for vertically positioning the wheel including mechanism for changing the directional orientation of the horizontal driving force of the wheel, while the wheel is substantially at said intermediate position; and said vertically positioning means, the wheel, and the directional orientation change mechanism, in combination, imparting a vertical raising and lowering motion to the wheel without changing the directional orientation of the wheel as it is moved between said raised position and said intermediate position.

2. A powered drive wheel unit for insertion into an opening in the floor structure of a cargo handling area, adjacent to which are means for supporting the cargo load, said powered drive wheel unit serving to move cargo in a horizontal plane and comprising: a ring member for mating insertion into the opening in the floor structure; a wheel support housing for the powered drive wheel; said wheel support housing being mounted for rotation within the ring member; means for vertically positioning the wheel support housing to three positions: a raised position for maximum frictional engagement of the powered drive wheel with the undersurface of cargo positioned thereon to move it in a horizontal direction, a lowered position for complete disengagement of the powered drive wheel with the undersurface of cargo, and an intermediate position therebetween for partial frictional engagement of the powered drive wheel with the undersurface of the cargo positioned thereon during transition between predetermined directionally orientated cargo driving positions; and said means for vertically positioning the wheel support housing including mechanism for changing the directional orientation of the horizontal driving force of the powered drive wheel, while the wheel support housing is substantially at said intermediate position; and said vertically positioning means, the wheel, and the directional orientation change mechanism, in combination, imparting a vertical raising and lowering motion to the wheel without changing the directional orientation of the wheel as it is moved between said raised position and said intermediate position.

3. The powered drive wheel unit as set forth in claim 2, wherein said means for vertically positioning the wheel support housing comprises: dual cam systems, having a first cam system interposed between the ring member and the wheel support housing, and a second cam system interposed between the wheel support housing and the floor structure.

4. A powered drive wheel unit for insertion into an opening in the floor structure of a cargo handling area, adjacent to which are means for supporting the cargo load, said powered drive wheel unit serving to move cargo in a horizontal plane and comprising: a ring member supportably mounted within the opening in the floor structure for rotation about a vertical axis; a ring gear segment fixedly attached to the underside of the ring member; a pinion gear and motor mounted to fixed structure within the floor opening for engageably driving the ring gear segment to rotate the ring member relative to the fixed floor structure about a vertical axis; a wheel mounted on an axle; a wheel support housing for supporting the wheel and axle for rotation about a horizontal axis; power means mounted to the wheel support housing for rotatably driving the wheel; dual cam systems having a first upper cam system interposed between the ring member and the wheel support housing for supportably mounting the wheel support housing for rotation within the ring member, and a second lower cam system interposed between the wheel support housing and fixed floor structure; said first upper cam system having a first cam track within the inner surface of the ring member, and a first cam follower attached to the wheel support housing; said second lower cam system having a second cam track fixedly attached to floor structure, and a second cam follower attached to the wheel support housing; said dual cam systems vertically positioning the wheel support housing to three positions: a raised position for maximum frictional engagement of the powered drive wheel with the undersurface of cargo positioned thereon to move it in a horizontal direction, a lowered position for complete disengagement of the powered drive wheel with the undersurface of cargo, and an intermediate position therebetween for partial frictional engagement of the powered drive wheel with the undersurface of the cargo positioned thereon; said dual cam systems changing the directional orientation of the horizontal driving force of the powered drive wheel while the wheel support housing is substantially at said intermediate position.

\* \* \* \* \*